United States Patent Office 3,208,867
Patented Sept. 28, 1965

3,208,867
SILICEOUS PRODUCT
Helmut Hans Wilhelm Weldes, Swarthmore, Pa., assignor to Philadelphia Quartz Company, Philadelphia, Pa., a corporation of Pennsylvania
No Drawing. Filed Oct. 12, 1959, Ser. No. 845,654
10 Claims. (Cl. 106—308)

INTRODUCTION

This invention generally pertains to the development of inorganic solids having novel properties by virtue of their being combined or reacted with certain organic compounds. More particularly, this invention pertains to a method for treating a solid substrate with a first organic "bridging" compound and then with a second organic "blocking" compound which is capable of reacting with the bridging compound. In one preferred embodiment the substrate is finely divided silica, the "bridging" compound is a polyisocyanate and the organic "blocking" compound is a polyol.

BACKGROUND

One of the important uses for finely divided siliceous products having particle sizes less than 100 mu is in the preparation of greases which, because they exhibit a low dropping point, are useful at relatively high temperatures, i.e., above about 150° C. To be effective in greases, these siliceous particles usually must either be nearly anhydrous or they must be treated with other additives. Moreover, greases formed with finely divided silicas, whether hydrated or not, tend to have a low resistance to water, to cause increased corrosion of metal, and to exhibit bleeding. Additives may be added to overcome some of these drawbacks, but such additives are usually found to have little resistance to oxidation.

Greases prepared with ordinary hydrated finely divided silica generally show good penetration properties but they lack water resistance and thin films heated to a high temperature soon break down. Bulk heating tests made with greases formed from finely divided silica and organic compounds appeared good but thin films failed due to oxidation. The addition of glycerine will produce such an improvement. As a minimum, these products should form a grease with a measurable penetration below 400 mm./10 after heating at 150° C. and not decompose, i.e., turn 100 percent white and start to break down after immersion in water at 40° C.

OBJECTS

It is, therefore, a specific object of this invention to treat finely divided hydrated silicas in such a fashion that the treated silica will have outstanding utility in grease formulations, and more particularly, will produce grease formulations which have good penetration properties, high resistance to oxidation, high resistance to water, heat stability and resistance to corrosion. A broader object is to produce coated inorganic substrates having a wide range of utilities and uses as components in various chemical compositions and particularly chemical compositions wherein the coated inorganic substrate reacts with other organic materials.

THE INVENTION BROADLY

This invention broadly pertains to a new product which comprises the following three materials:
 (a) A solid substrate,
 (b) An organic bridging compound, and
 (c) An organic "blocking" compound.

This broad invention will be exemplified with particular reference to finely divided hydrated silica, polyisocyanate and polyols. It will be evident that the same principles apply to a number of equivalent materials and those skilled in this art will readily understand what such equivalents comprise. The results of the reaction will most often be checked by testing the reaction product in a grease formulation.

My new reaction products form greases with oleaginous material, and such greases have not only good penetration properties and high resistance to water, but are heat stable above 150° C. and are quite resistant to oxidation, while exhibiting little evidence of corrosivity.

THE SOLID SUBSTRATE

The solid substrate of this invention generally includes high surface area hydrophilic inorganic solids or solid inorganic materials having surface hydroxyl groups. Preferably they have a high ratio of surface area to mass, and they may be described as hydrophilic, inorganic materials of colloidal particle size. More particularly, the solid substrate may consist of silicates, aluminates, etc., of divalent and trivalent metals, silicas, aluminas and various other high surface area, hydrophilic solids, natural clay minerals having a high surface area and high ion exchange capacity. The preferred substrates are the finely divided siliceous materials such as precipitated silicas and silicates. Those having particle sizes below 100 or even 50 mu are especially useful. An inorganic solid that is gel-forming in water and/or possesses ion exchange properties can be used. Among such materials are hydrophilic, inorganic solids having a surface area of at least 10 square meters per gram and capable of ion exchange reaction. Preferred materials are natural and artificial silicates of aluminum, magnesium, iron, calcium and other divalent and trivalent metals that have a high surface area and good absorptive properties.

Other desirable materials include metal oxides and hydroxides and metal carbonates with especial reference to silica, titania, alumina, aluminum hydroxide, iron hydroxide, calcium carbonate, molybdenum oxide and zinc oxide. Suitable hydrophilic inorganic materials forming a gel in water include oxides and hydroxides of alkaline earth metals and other polyvalent metals, especially di-and trivalent metals such as aluminum, iron, vanadium and certain phosphates, sulfides and sulfates of heavy metals, as for instance, molybdenum sulfide.

Those clays capable of taking up the largest quantity of "bridging" compound or isocyanate are usually the clays of the expanding lattice type having substantial base exchange capacity, preferably at least 20 milliequivalents and often up to 100 or more milliequivalents per 100 grams of clay. For example, Wyoming bentonite, which is sodium bentonite, is quite effective. Calcium bentonite and acid clays can be used. Kaolinite, hectorite, magnesium substituted montmorillonite in general, beidellite, attapulgite, nontronite, and saponite are other examples. Asbestos is useful as are related fibrous crystalline anhydrous silicates. Other silicates such as mica and suitable glasses in fiber form can be employed. In general, I prefer the finely divided hydrated clays such as montmorillonite and hectorite which are fine enough to be effective fillers in greases.

Among the hydrated siliceous materials which may be used are finely divided hydrated silicas produced by the Philadelphia Quartz Company and also the finely divided hydrated silicas known under the tradenames of Hi-Sil 233 and Hi-Sil 303. The xerogels in finely divided state such as "Syloid" are usually of somewhat larger particle size but the reactive silanol groups may be caused to react in the same process.

The aerogels, both those formed pyrogenically and those formed by removal of solvent (such as for instance Cab-O-Sil and Santocel) may be treated in like fashion. It is to be noted that when a siliceous material having a very low water content is used in this process the product, with the polyisocyanate alone will usually form a fairly satisfactory grease without the additional reaction of a polyol. However, for certain uses it is advantageous to carry out the procedure of this invention, that is to bring about the additional reaction of the polyol with the remaining unreacted isocyanate groups.

For use in greases particularly, I find that the finely divided silica material should have an area ranging from about 50 to 800 m.²/g. but in general I prefer to have a range of about 200 to 600 m.²/g. In general, also, the particle size should be below 100 mu and preferably between about 7 and 30 mu. While the aerogels which ordinarily have a water content of below about 4% can be coated with my process, I generally use hydrated siliceous materials containing 4 to 20% of water and especially prefer those containing about 8 to 15%.

THE BRIDGING COMPOUND

There are a very large number of organic compounds which are suitable as bridging compounds in accordance with this invention. The polyisocyanates are the preferred bridging compounds, but polyketenes, polymerizable halides (such as vinyl chloride and dichloroethane), epoxy compounds or certain other compounds may be used. It is believed that the great majority of these suitable compounds can be represented by the general formula:

$$R(XCY)_{n>1}$$

where R is an organic hydrocarbon or substituted hydrocarbon group, C is carbon, X is a member of the class consisting of C and N, and Y is a chalcogen (preferably oxygen or sulfur) or a —N^A group where A is hydrogen or a monovalent hydrocarbon radical. These materials can provide more than one —NCO, —NCS, =C=CO and =C=CS groups for interaction with the hydroxyl group or the inorganic surface of the substrate. Thus, the polyisocyanates have more than one isocyanate or isothiocyanate group attached to an organic group R which may be an alkyl group of one to twelve carbon atoms, an alkyleneyl group (unsaturated divalent aliphatic group) and a group such as phenene, naphthenyl, etc., a cycloaliphatic group, and a heterocyclic group. The organic groups R have neither hydroxyl, carboxyl or amino substituents and the like, but may have other types of substituents. Functional groups are not desired because of the possibility of interaction.

One may use vinyl isocyanate, allyl isocyanate, vinyl phenylisocyanate and other monocyanates having homopolymerizable unsaturated groups whereby polyisocyanates may be formed in situ on the pigment surface.

Other compounds having one and preferably more than one separate and distinct group of the general formula X=C=Y may be used. Examples of such other compounds are diketenes, dithioketenes, dicarbodiimides, diketenimines and unsaturated ketenes such as vinyl ketene may be used in place of the isocyanate compounds although the treatment is somewhat less satisfactory because of the much slower reactivity. Examples of these less reactive but usable compounds include ketene, vinyl ketene and vinyl thioketene, hexane-2,9-diketene, 1,8-diacetyl-8-diketenyl octane

(O=C=C—(CH₂)₆—C=C=O)
 |        |
 CH₃    CH₃ and the corresponding thioketenes,

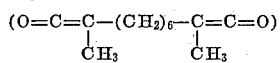
(C₆H₅)N=C=N—(CH₂)₆—N=C=N(C₆H₅)
HN=C=N—(CH₂)₆—N=C=NH
HN=C=N—(C₆H₄)—N=C=NH
C₆H₅N=C=N—(C₆H₄)—N=C=NC₆H₅

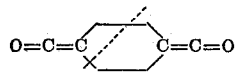
O=C=C    C=C=O
     \  /
      X

Still other compounds capable of forming the interlocking mechanism between the hydroxyl of the blocking compound and the hydroxyl of the substrate are polymerizable vinyl chlorides, vinyl bromides and vinyl-idene chlorides and bromides and compounds having a plurality of spaced halogen (preferably chlorine) groups on different carbon atoms which are not attached by carbon-to-carbon double bonds. Thus the chlorine in polyvinyl chloride is much more reactive to hydroxyl and sunlight than is the chlorine in vinyl chloride monomer or in chlorobenzene where the carbon carrying the chlorine is unsaturated. Examples of other chlorine containing compounds suitable are tetrachloromethane, dichlorethane, trimethylene trichloride and its higher homologs, etc.

Another group of compounds which form poly-addition products with alcoholic hydroxyl groups are epoxy compounds having terminal ethylene oxide groups for example, the epoxide formed by reacting 4,4' dihydroxy diphenylmethane with epichlorohydrin of the formula

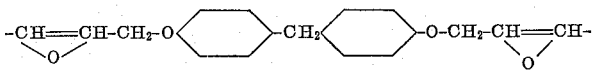

as well as its higher homologs in which other hydrocarbon radicals are replaced in the CH₂ groups.

All the linkage or bridging compounds may be described as compounds which are capable of forming poly-addition compounds with alcoholic hydroxyl groups. They are selected from the group consisting of epoxy compounds containing a terminal ethylene oxide group, organic polyisocyanates, and polyisothiocyanates, betapropiolactone, diketenes, di-allylidene pentaerythritol acetal and polymerizable vinyl halides and all of the compounds mentioned in this section.

The most common type of aliphatic polyisocyanates are the alkyl polyisocyanates, either unsubstituted or those wherein the alkyl group is substituted with non-functional groups such as chloro, nitro or bromo as in trichloro, trinitro and tribromo alkyl polyisocyanates. Such groups can be valuable in that the final product is reactive, by virtue of the presence of such groups, with various chemical reagents, thus providing materials of a wide variety of uses. Alkenyl polyisocyanates can be employed and the alkenyl groups can similarly have non-functional substituents. Among the alicyclic polyisocyanates, the cycloparaffinic and cyclo-olefinic, either unsubstituted or substituted similarly to the alkyl and alkenyl as described above, are preferred. The alkyl or alkenyl groups can be straight chain or branched chain configuration. Aryl polyisocyanates include those wherein the isocyanate groups are attached to an aryl nucleus as for instance, benzene or naphthalene. The alkaryl and aralkyl polyisocyanates can be considered as coming within either group as, for instance, the 2,4-toluene-di-isocyanate. More than one isocyanate group can be attached to a heterocyclic nuclei, e.g., the furane group, said nuclei being unsubstituted or substituted with hydrocarbon or other non-functional groups, Isocyanate groups can likewise be attached to aliphatic, alicyclic or aryl groups attached to heterocyclic nuclei.

The invention is likewise applicable to all organic polyisothiocyanates, although those skilled in the art will appreciate that not all of the isothiocyanates are full equivalents of each other or of the various isocyanates for the purposes of the invention. It will suffice to point out that what has been said above regarding the isocyanates is applicable to the isothiocyanates and the isothiocyanate analogs of all the classes of isocyanates and specific isocyanates named herein are also useful in the practice of the present invention. Ordinarily, a single polyisocyanate or isothiocyanate is used. However, a mixture of two or more can be used if desired. Furthermore, a substance containing both isocyanate and isothiocyanate groups can be used.

These various polyisocyanates are normally high boiling liquids or solids which are readily soluble in common organic solvents. Many polymerize to form dimers, trimers and other polymers, which may be used in the invention. In general, the aromatic diisocyanates are preferred.

Among the commercially available di-isocyanates are the toluene-2,4-di-isocyanate with a melting point of 21.7° C.; a mixture of 80% toluene-2,4-di-isocyanate and 20% toluene-2,6-di-isocyanate; and 3,3'-bi-tolylene-4,4'-di-isocyanate with a melting point of about 71° C.; the methylene-bis-(4-phenylisocyanate) with a melting point of 37.2° C.; the dianisidine-di-isocyanate with a melting point of 122° C.; and the 3,3'-di-methyl-di-phenyl-methane-4,4-di-isocyanate, M.P. 31.4° C. Polyisocyanates suitable for use are the 1,8-n-octane-di-isocyanate, 4,4',4"-triphenylmethane tri-isocyanate, 2-butene-1,4-di-isocyanate, metaxylene-a, a'-di-isocyanate, cyclohexane-1,4-di-isocyanate, the ethylene di-isocyanate, cyclohexylene-1,2-di-isocyanate, butylene-1,3-di-isocyanate, trimethylene di-isocyanate, tetramethylene di-isocyanate, butylidene di-isocyanate, p,p'-diphenylene di-isocyanate, phenylene di-isocyanate, 1-methylphenylene-2,4-di-isocyanate, benzyl di-isocyanate and triazine tri-isocyanate.

There are also hexamethylene-di-isocyanates, methylene di-isocyanate, ethylenyl-di-isocyanate and polymethylene-polyphenylene-isocyanate. Included generically with the isocyanates are the corresponding isothiocyanates and the mixed isocyanate-isothiocyanate compounds.

THE ORGANIC BLOCKING COMPOUND

The organic blocking compound is broadly an organic compound with two or more carbon atoms and having one or preferably more hydrogens more reactive with the bridging compound, e.g., a polyisocyanate, than are the hydroxyl groups of the substrate, said hydrogen being linked to carbon in the blocking compound through O, S, N, etc. General examples are alcohols, thiols, amines, imines, phenols, carboxylic acids, amides, and compounds containing active methylene groups capable of enolization.

Among the alcohols and polyols which may be used in this invention are propanol, ethylene glycol, propylpropylene glycol, diethylene glycol, glycerol, the polyethylene glycols having molecular weights in the range of 200, 400 and 600, etc., the polypropylene glycols having molecular weights of 150, 425 and higher and the methoxy polyethylene glycols. In addition, we may include the alpha and beta propylene glycols. Glycerine substitutes such as those known as Niax Triol LHT42, LHT112, LHT240 and LG56 may be used and the higher polyethylene glycols having molecular weights in the range of 4000 to 6000 and even higher may be substituted. Higher polyols such as the sugars, castor oil, pentaerythritol, hexanediol, 1,2,6-hexanetriol, trimethylolethane and trimethylolpropane, are generally alike.

While most of the examples used in this application involve liquid polyisocyanates and polyols, it is obvious that solid equivalents of these materials could be used provided they are first liquefied either by melting or with inert solvents which will not react to block off the isocyanate groups.

MIXING AND REACTION PROCEDURES

In general, the preparation of a product of this invention is relatively simple and straight forward. While the finely divided solid substrate or siliceous material is vigorously agitated the bridge-forming material, e.g., polyisocyanate, is introduced. It is usual that the temperature rises between about 3 and 20° C., depending on the reactants and the amounts present. Following this, the reaction is allowed to go to completion. This can be hurried by raising the temperature and usually the temperature is raised to somewhere between 40 and 80° C. and kept there for about one-half to one hour. The polyol or blocking reactant is then added and the mixture heated for an additional half hour at about 60° C. It is not necessary to maintain the original solid substrate at room temperature since the reaction can be speeded up by starting with a finely divided silica at a temperature of 60° or even as high as 100° C. The higher the initial temperature, the more rapidly the polyisocyanate reacts. Where the finely divided silica is preheated to 60° the isocyanate reaction can be completed in about 5 minutes and the polyol can then be added and kept for a further half hour of reaction time at 60° C. or the polyisocyanate and the polyol can be added simultaneously from two different sources to the preheated finely divided hydrated silica. This agitated reaction mixture is then kept for about a half hour at the temperature of 60° C. If the initial temperature is about 100° C., the polyisocyanate and the polyol can be added simultaneously from two different sources and the reaction is almost instantaneous taking place in much less than 5 minutes.

Ordinarily, laboratory reactions are carried out in three-necked, round bottom flasks equipped with a stirrer, a dropping funnel and a thermometer and an oil bath for control of the temperature of the reaction. It usually takes about 5 minutes to run the reactants into the reaction mixture from the dropping funnel. More rapid means of addition would be suitable.

In carrying out this reaction it must be emphasized that the di-isocyanate or other bridge forming material must be handled in a system which is free of water and is air-tight as possible. It may be added to the finely divided solid silica, in a separate vessel equipped with a suitable agitator either by dropping funnels or spray nozzles or it may be added to the finely divided silica in a closed conveyor system. It will be necessary to balance the temperature and the retention period so that the reaction time is sufficient. At 100° C., the retention period may be shorter than 2 minutes. At about 80° C. this period should be at least 2 minutes. Longer times will, of course, be required for lower temperatures of reaction.

It should further be noted that while the di-isocyanates are strong irritants of the eyes, skin and respiratory tract and chronic exposure to inhalation of these fumes may result in bronchitis, the reaction products of my process are non-toxic since the di-isocyanates are caused to react completely and thus, greases (for instance) formed with my product will contain no toxic material.

It should further be emphasized that the substrate should not be coated with some other compound prior to reaction with a bridge forming reactant. Also, if the said bridging reactant and the blocking compound are applied, the blocking compound must be used along with or after the bridging reactant has been added in order to be sure that one of the active groups of the bridging compound reacts with the surface of the substrate before the blocking compound itself reacts. The bridging compound and blocking compound cannot be premixed but may be introduced simultaneously. Adequate mixing or agitation during the reaction is important because the reaction occurs at the solid-liquid-gas interface.

*The temperature of reaction.*—While the temperature of the reaction may vary from about room temperature to the boiling point of water or even to the boiling point of the reactants, we find that if temperatures of about room temperature are used, long periods of a day or two may be required for the necessary reaction. However, if the temperature is raised to 40° C. and preferably to above 60° C. the reaction may take place in an hour or less and at temperatures of about 100° C. the reaction will take place in much less than 5 minutes and perhaps almost instantaneously.

Apparently, it is necessary to raise the polyisocyanate to a temperature at which the vapor phase becomes richer. Above the temperature of about 100° C. too many hydroxyl groups appear to be lost from the surface and the vapor pressure of the polyisocyanate becomes too high. Also above about 200° C. decomposition may occur.

In general, an isocayanate will react with an amine or alcohol above about 0° C., with water or a carboxyl group above about 25 or 50° C., and with urea, urethane, or amide above about 100° C. These latter may be reaction products of isocyanates with amines. Most urethanes decompose in the temperature range of 150–200° C., although those with tertiary alcohol will start at 50° C.

As a further indication of the effect of temperature, phenyl isocyanate in reacting with the following materials at the stated temperature varies in rate of reaction as shown by the rate constant K.

|  | 60° C. | 80° C. | 100° C. | 140° C. |
|---|---|---|---|---|
| Phenyl urea | 3.7 |  | 32 | 48 |
| n-Butyric acid |  | 1.6 |  |  |
| Diphenyl urea |  | 4.8 | 9.9 | 23 |
| Water |  | 5.9 |  |  |
| n-Butanol |  | 27.5 |  |  |

Strong bases have a vigorous catalytic effect on these reactions.

The reaction is manifested by evolution of $CO_2$ (disappearance of the isocyanate character of the reactant) and increased organophilic character of the substrate.

An isothiocyanate will often require longer reaction time and/or higher temperatures than its corresponding isocyanate analog. Temperatures of 50° and up are suitable. Higher temperatures provide shorter reaction time, but it is preferred not to exceed 150° C. in order to avoid decomposition of the solid and/or the product. Thus solvents such as boiling benzene, toluene or xylene, operating at atmospheric pressure are satisfactory, with toluene in some instances being the best. With the lower boiling organic liquids, pressure can be imposed on the system to increase the reaction temperature as desired. While refluxing is not necessary, it is advantageous in providing efficient agitation at all times.

*Contacting reactants.*—It is generally preferable to contact the substrate with either the bridging or blocking compound in vapor form if it is readily vaporizable, or if not, to dissolve or disperse them in a solvent such as a suitable hydrocarbon, anhydrous ether, chlorinated solvent or any other similar liquid which does not react with the bridging compound or the substrate and which may be extracted from the product by volatilization.

Instead of refluxing in an organic liquid another preferred procedure involves heating the substrate and bridging compound in a closed system. This is termed the "vapor phase" method inasmuch as an appreciable vapor pressure of the bridging compound is present. By this procedure, the substrate solvent and a chosen amount of bridging compound are placed in a pressure vessel, preferably adapted to agitate by tumbling or stirring. The adduct can be prepared at temperatures apparently considerably higher than those tolerated in the refluxing procedure. Such temperatures can be, for example, 100° C. to 250° C. A suitable reaction time will usually be found to be from 1 to 5 hours. One advantage of the vapor-phase procedure described is that for a given amount of bridging compound a more hydrophobic adduct is often produced.

Still other methods of reacting the bridging compounds with substrate will be apparent to those skilled in the art. Thus a finely divided clay can be fluidized by passage of a gas upwardly through a body at flow rates adapted to maintain a fluidized bed of suspended solids. The vaporized bridging compound can be introduced into the body of suspended solid by being carried in with the fluidizing gas.

*The solvent system.*—Hydrocarbon organic liquids are preferred where solvents are required. These are the aromatic, alicyclic and aliphatic hydrocarbons such as benzene, toluene, xylene, cumene, cyclohexyl benzene, cyclohexane, dimethyl pentane, octane, dodecane and naphthas boiling between 50° C. and 150° C. Olefinic and cyclo-olefinic hydrocarbons can be used, but are less preferred because of their cost and high reactivity. Hydrocarbons substituted with non-functional groups and ethers are also permissible. In this connection, it is desirable to avoid alcohols, carboxylic acids, esters and amines that easily undergo reaction with isocyanates. Likewise, it is desired to avoid amines and other compounds that may react with the substrate. Nitro and halogen substituted hydrocarbons are suitable. The following are examples: n-propyl ether, isopropyl ether, methyl hexyl ether, dibromobutane, ethylene dichloride, carbon tetrachloride, nitrobenzene and nitrobutane. Choice of a suitable quantity of organic liquid is principally dependent upon the ease of manipulation. From 1 to 5 parts by weight of organic liquid for each part of solid is usually sufficient.

*Concentrations of reactants.*—The relative amounts of solid substrate, bridge forming reactant and blocking compound will vary widely with the properties desired and the materials employed.

The reaction involved may be described by the following idealized formula:

Solid      Bridging Compound    Blocking Reactant

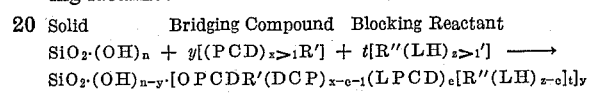

$$SiO_2 \cdot (OH)_n + y[(PCD)_{x>1}R'] + t[R''(LH)_{z>1'}] \longrightarrow$$
$$SiO_2 \cdot (OH)_{n-y} \cdot [OPCDR'(DCP)_{x-e-1}(LPCD)_e[R''(LH)_{z-e}]_t]_y$$

Where $n$, $x$, $y$, $z$, $e$, and $t$ are numerals and C is carbon, H is hydrogen, $SiO_2$ is silica or other solid substrate having hydroxy groups on the surface, D is C or N (where N is nitrogen) and P is a chalcogen (that is a member of the group of O, S, Se or Te) or an NA group where A is hydrogen or a monovalent hydrocarbon radical. L is either O or S. R' and R'' are organic radicals containing no groups reactive with the other reagents present and having a plurality of carbon atoms. In R'' the carbon atoms are sufficient to provide a boiling point above about 100° C.

It will be seen that the critical relationship is between the substrate reactive groups, e.g., OH, and the reactive groups of the bridging compound. Thus I prefer to consider the proportions in terms of chemical equivalents in this reaction. In general there is little advantage in using more than one equivalent and for many applications, as low as 0.1 or 0.2 equivalent of bridging compound may be used for each equivalent of reactive group, e.g., OH, on the substrate surface. The blocking compound also may be used in proportion to the reactive groups of the bridging compound. It may or may not be desirable to saturate the remaining reactive groups of the bridging compound.

In dealing with clays as substrate it is sometimes desirable to calculate stoichiometric amounts on the basis of the base exchange capacity of the clay and usually a stoichiometric amount or slight excess is preferred on this basis. Thus, bentonite having a base exchange capacity of 80 milliequivalents per 100 grams is reacted with 80 milliequivalents of isocyanate if the stoichiometric quantity is to be used. From one to two times the stoichiometric quantity is to be used. From one to two times the stoichiometric quantity of isocyanate is usually employed. The actual quantities are dependent on a number of factors. The association is not believed to be caused by a base exchange type of reaction. It may involve the formation of a disubstituted urea by reaction of the isocyanate with adsorbed water or perhaps the urethane type of product by reaction of the isocyanate with the hydroxyl groups of clay.

While as little as 1% by weight of bridging compound based on the substrate will in some instances be useful, most preparations are made with 5–50% by weight of the bridging compound. Up to 100% by weight and more is sometimes advantageous.

THE NATURE OF THE REACTION

Although I do not wish to be limited by any theory as to the nature of the reaction which is involved in my invention, a general discussion using di-isocyanates as an example of the bridging compound and hydrated silica as the substrate is believed worthwhile in order to promote a better understanding of the invention.

In di-isocyanates the isocyanate groups, being negative substituents, influence each other and one of the groups does react much faster than the other. However, if one of the isocyanate groups has disappeared by reacting with a silanol group, that is a hydroxyl group on a siliceous surface, the left-over or second isocyanate group has a much lower reaction rate. This behavior is exemplified by the reaction of finely divided silica with diisocyanates and blocking compounds such as glycols, polyols, etc. If a finely divided hydrated silica is allowed first to react with a di-isocyanate alone the reaction of one of the isocyanate groups with the hydroxyl, silanol or OH group on the finely divided hydrated silica is very fast provided the temperature conditions are in the right range. When this first isocyanate group has reacted, the second isocyanate group is less active and consequently it reacts considerably more slowly or not at all with silanol groups. If, at this point, a second additive capable of reacting with an isocyanate group is added to the reaction mixture, the OH groups on the finely divided hydrated silica and the second additive compete in their reaction for the second isocyanate group. Especially in the case of polyols as the second additive, the reaction rate is higher with the polyol than with the silanol groups and the second isocyanate group reacts only with the polyols. Since this second additive blocks further reaction of the isocyanate group, I have chosen to refer to it as a "blocking" compound. No doubt steric factors play an important role here.

Tests were run to confirm the assumption that on treating finely divided silica with isocyanates and with polyisocyanates plus other blocking compounds, more than a mere absorption takes place on the surface of the finely divided hydrated silica. The tests showed that a real chemical reaction occurs. In the first test the finely divided hydrated silica was treated with 135% molecular equivalents of toluene 2,4-di-isocyanate (Hylene T), that is 35% excess molecular equivalents over the amount of free and bound water available on the finely divided silica, or, stated differently, 135% of the ignited loss of the finely divided hydrated silica where the ignited loss was translated into molecules of water. Then it was determined how much of the isocyanate could be removed by vacuum distillation. By this process it was possible to distill off only the excess over the molecular equivalent. The ignition loss of the product after distillation was found to be 56.2% by weight which was almost theoretical (55.3%) for a reaction with all of the hydroxyl groups present (bound+free=ignited loss of the finely divided hydrated silica=12.1%). A water molecule was considered equivalent to one OH group as outlined in the discussion of the calculation of equivalence. (See below.)

A second test to show that mere absorption did not take place was the benzene extraction of a reaction product of one equivalent of the Hylene T and finely divided silica in a Soxhlet extraction flask for 6 days. By this means, only 15% was extracted. The thoroughly dried compound still had an ignition loss of 49.8% compared with the theoretical 55.3% for a 1:1 reaction product on the molecular basis. After this extraction the product was completely water repellent as it has been after the first test.

In a third test the reaction product of finely divided hydrated silica with Hylene T and polyethylene glycol as a blocking compound was extracted with benzene in the same way for 6 days. Only 4.4% of the product with an original ignited loss of 67.0% was extracted.

These results all show that a chemical reaction takes place between the surface hydroxyl groups of the finely divided hydrated silica and the isocyanate group and furthermore, if a polyol (blocking compound) is applied, it also actually reacts with the remaining available isocyanate group. It should be noted here that it is necessary for the success of this reaction that the hydroxyl groups be attached to the silica surface either as or similar to silanol groups. If, for instance, a blocking compound such as glycerol has been used with the finely divided hydrated silica prior to the reaction of the isocyanate, then the isocyanate will react with the hydroxyl groups of the blocking compound and the isocyanate will then not be bound directly to the silica. In all cases where a blocking additive is placed between the silica, or substrate, and the isocyanate, no bridging bond is produced and the product cannot be used with satisfaction as in grease. It is necessary to permit the isocyanate to react directly with the silanol type groups and thus usually the isocyanate or the polyisocyanate must be added before the polyol or at least at the same time as the polyol is added.

I have found that if one isocyanate group of a polyisocyanate is attached to a surface silanol group of a hydrophilic inorganic solid such as a hydrated silica and a second isocyanate group of the same polyisocyanate is permitted to react with a blocking compound having an active group such as a hydroxyl group of an organic compound having a high boiling point, a grease additive is obtained which forms a grease having very desirable properties. This blocking compound with active hydrogen groups usually contains multiple alcohol groups, or alcohol and ether groups, etc., which lead to the high boiling point required.

The isocyanates are aliphatic or aromatic compounds containing one or more isocyanate groups, —N=C=O. These groups are very reactive. They react with virtually all compounds containing active hydrogen according to the following equation:

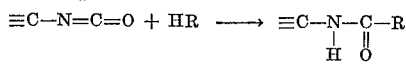

This is a simple 1,2-addition on the N=C double bond. Therefore, no undesirable by-products are formed during the reaction, such as water in condensation reactions, etc.

The reaction with isocyanate and polyisocyanate alone results in a finely divided silica forming grease with either improved water resistance or improved heat stability. However, no tests showed both properties simultaneously. This improvement was obtained only when polyisocyanates were applied in combination with other blocking reactants such as glycols, etc.

These considerations apply only to hydrated finely divided silica. A more or less anhydrous finely divided silica, such as an aerogel, will form both water and heat stable greases if reacted with an isocyanate alone without further additive but these forms of silica are considerably more expensive than hydrated precipitated finely divided silicas.

*Characterization of the product*

As one means of differentiating the products of my invention I have compared their properties in a standard grease.

Various oleaginous materials may be used to form greases with the products of this invention but a mineral oil known as Tiona 1050 was representative of the usual types of lubricant and was used as the standard. However, satisfactory greases were also prepared from synthetic high temperature lubricants. Thus, a good grease was formed from dioctylsebacate as well as from a polyalkylene glycol ester. In another case a grease was formed from tetra-(2-ethylhexyl)-orthosilicate. Other synthetic high temperature lubricants would undoubtedly be just as satisfactory.

I have found that the monoisocyanates such as n-butyl, n-octadecyl-, phenyl- and para-tolyl-isocyanates will react normally with the silanol groups on the surface of finely divided silica and while these products may be useful for some purposes, it was found that they fail to give water resistance even though good penetration and heat stability properties were exhibited in grease tests. On the other hand, if the finely divided silica or finely divided hydrated silica was coated with a polyisocyanate such as toluene 2,4-di-isocyanate or a mixture of this with a homologous 2,6-di-isocyanate, a grease may be formed with excellent water resistance but only fair penetration and poor heat stability. One might think that mixtures of di-isocyanates and monoisocyanates would combine the properties of both but this is not the case. Such combinations gave greases which had properties which were inferior to those involving only one type of isocyanate.

It was further found that, as I have indicated, any precoating of the finely divided silica with a polyol such as glycerine or an amine such as tetrahydroxyethylethylenediamine prevented the formation of a true grease-forming material. Apparently the precoating prevented the reaction of the isocyanate with the silanol groups on the surface of the finely divided silica.

I have also corroborated the knowledge of the prior art that an aerogel such as Cab-O-Sil (15–20 mu size, 1.49% $H_2O$, 175–200m.$^2$/g.) may be treated with an isocyanate or a di-isocyanate and will form a grease which not only has good penetration and excellent water stability but exhibits good heat stability. However, such aerogels are considerably more costly than hydrated finely divided silica and therefore it is important to find an economical means of using a finely divided hydrated silica instead of the more expensive aerogels. Since the di-isocyanates react with a finely divided hydrated silica to form products which have satisfactory penetration and water resistance when used in greases I decided that it might be worthwhile to add a heat stabilizing compound to such a product. I have found that the only useful blocking compound which will react further with the finely divided hydrated silica treated with a di-isocyanate are polyols or equivalent materials such as the thiols with more than two carbons in the molecule. Thus, materials like diethylene glycol, glycerine, polyalkylene glycols, etc. will form products which show good properties in greases. Additives containing amino groups were less satisfactory.

I have found that the properties of greases formed from my finely divided hydrated silica coated with a di-isocyanate plus a polyol may be varied by changing the proportions of the di-isocyanate and the polyol. For instance, increasing the proportionate amount of di-isocyanate tends to increase the water resistance of the final grease but decreases the penetration and heat stability. However, increasing the amount of the polyol increases penetration and heat stability but decreases the water resistance. However, these effects are relatively minor in the concentration regions which produce satisfactory greases.

In general, I prefer to use a silica having a high surface area since with lower surface areas, gauging the proper proportion of di-isocyanate to react with the surface of the finely divided hydrated silica is apparently rather critical. If too much di-isocyanate is added to the surface it becomes too organophilic and the penetration values become too high. On the other hand if the di-isocyanate coating is reduced water repellence may be lost before a reasonable penetration value is obtained unless the surface area of the finely divided hydrated silica is sufficiently high.

In considering the results of the examples which follow it is well to remember that greases may be prepared more satisfactorily on a large technical scale than in the laboratory and that therefore even better properties may be obtained in commercial practice than are set forth in some of the smaller samples shown. The greases prepared with my reagent may be semi-opaque or translucent depending in part on the type of di-isocyanate employed. Those made with the 2,4-di-isocyanate for instance, were semi-opaque whereas those made with a mixture of the 2,4 and 2,6-di-isocyanate tended to be translucent.

EXAMPLES

In the following examples the proportion of di-isocyanate and polyol is usually given in terms of equivalents. By this is meant the molecular equivalents of isocyanates to water as determined by ignition of the finely divided silica. One molecule of water was considered as equivalent to one OH group in these calculations. For instance, if the finely divided silica had an ignition loss of 12.1% and 12 grams of this silica were to react with one equivalent of di-isocyanate having a molecular weight of 174, the following reaction resulted. One mole or 17.00 g. OH=174.00 g. of Hylene T (one molecular weight). If 12 grams of the finely divided silica contains 12.1% of $H_2O$ it therefore contains 1.45 g. of $H_2O$ or as indicated here, 1.45 g. of OH. Then, using the above relationship, 1.45 g. of OH will be equal to 14.85 g. of Hylene T and the reaction of 12 grams of the finely divided silica using one equivalent of Hylene T would require 14.85 grams of the di-isocyanate. The polyols were calculated in the same way using one molecule of polyol for each hydroxyl group on the silica.

The product of each reaction was made into a grease, using 12 parts of the finely divided silica having 10% ignition loss with 88 parts of Tiona 1050 mineral oil, having the following properties:

| | |
|---|---|
| A.P.I. gravity, degrees | 28.3 |
| Saybolt Universal viscosity: | |
| at 100° F. | 1008 |
| at 210° F. | 89 |
| Viscosity index | 96 |
| Pour test, °F. | 0 |
| Color | 4 |

When heated 16 hours at 105° C. this oil showed no change in weight or viscosity after cooling.

The greases were made up using a Morehouse Model 8200 Grease Mill adpusted to 0 clearance. After preparation and before testing the greases were agitated in the grease worker using 60 strokes per minute at approximately 77° F. as room temperature.

Two penetration tests were used during the course of our experiments. One was the ordinary penetration test which is known under the name of ASTM-D217-52-T. This test was used for large samples of grease and is referred to in each of the tables giving the properties of the silicas themselves. However, since many of the samples prepared during our experiments were too small to be used in the above mentioned test, the one quarter cone micropenetration test was used which is described in ASTM-D1403-56-T. Where this latter test has been used throughout the examples, it has been so designated by describing the penetration test as a micropenetration value or the letter M has been used before the penetration number. In a very few cases both designations have been used. This micropentration test was used with all of the oxidation stability test samples because only small amounts of grease could be tested.

To show the effect of proper mixing in one of my tests carried out on a small scale, the penetration was 283 mm./10 whereas a much larger batch as prepared for Example #2 but otherwise using actually the same proportions of materials, showed a penetration of 307 mm./10. Thus, with my equipment the larger batches could not be thoroughly mixed and it is expected that the results on a commercial scale would be considerably improved.

Water resistance was determined by stenciling a circle of grease $\frac{1}{32}$ of an inch thick by $\frac{1}{2}$ inch in diameter on a stainless steel sheet. These samples were suspended in water either at room temperature of 77° F. for 16 hours or at the boiling point of water (100° C.) for 3 hours. Absorption of water was indicated by the whitening of the grease. I have used as a minimum acceptable limit, a whitening of 100%. Beyond this point the grease actually disintegrated.

In the Navy water absorption test 50 grams of the grease were mixed with increasing quantities of water using a ¾ inch diameter by ¼ inch thick disk rotating at 860 r.p.m. in the grease. The water was added until the grease inverted to an oil-in-water emulsion.

In the bulk heating test, one pound of grease was heated for 20 hours at 150° C., cooled and tested for penetration by the ASTM penetration test mentioned above. In the thin film heating test, films 1/16 of an inch thick by 2¾ inches in diameter on a stainless steel plate were heated as indicated in the examples. The color scale used was:

(1) Very slight darkening
(2) Slight darkening
(3) Moderate darkening
(4) Severe darkening B indicates blistering, C indicates cracks, HA indicates hardening.

The water wash-out test follows that of ASTM–D1264.

Grease oxidation stability was determined by treating 20 grams of grease in an oxidation bomb at 210° F. for 100 hours at 110 pounds per square inch of oxygen.

I have found that the greases thickened with my compositions when properly prepared are heat stable in both bulk heating and in thin film tests. The penetration after 20 hours at 150° C. is almost the same as that at 20 hours after 107° C. In the oxidation stability test the pressure drop in the oxidation bomb was between 5 and 8 p.s.i. regardless of the additive used with the di-isocyanate. It should be remembered that no anti-oxidant is used in these greases. In a bleeding test carried out for 4 days at 55° C. only 0.85% of the oil bled out. This is a very good result.

With careful formulation the water wash-out test at 175° C. may amount to no more than 10%. In some examples, however, it varied from 22 to 43%. We have not found any additive used with the di-isocyanate which will give other satisfactory grease properties and still have a lower water wash-out test comparable with the 2 or 3% exhibited when di-isocyanate is used alone without an additive.

In the water absorption test we found that inversion with the glycerine additive occurred only after the addition of about 55% water whereas with a polyethylene glycol only 25% water seemed to be required.

The corrosion of these greases was investigated with copper, brass and steel strips. Such strips were coated with a layer of grease and kept in a closed vial for 20 hours at 80° C. or for one month at room temperature. Those silica greases in which glycerine had been used as the polyol showed no corrosion or only very slight corrosion whereas those with the polyethylene glycol exhibited more or less heavy corrosion. In the case of copper and brass all greases caused a green coloration. In each of these tests a small amount of water was worked in with the grease to help develop corrosion. It was found that when this water was absent corrosion did not develop with the polyethylene glycols. It is thought that this corrosion phenomenon is related to the inversion from a water-in-oil to an oil-in-water emulsion.

Parts and percentages are by weight unless otherwise indicated.

EXAMPLE 1

In this test, 120 grams of a finely divided hydrated silica having the following properties

| | |
|---|---|
| $SiO_2$, percent | 87.5 |
| Ignited loss, percent | 12.1 |
| Free water, percent (105° C.) | 6.75 |
| Aver. Particle Size, mu | 11 |
| Grease penetration, mm./10 | 242 |
| pH | 5.9 |
| Area, $m.^2/g.$ | 284 | was placed in a three-necked glass flask equipped with a stirrer, a dropping funnel and an inside thermometer. This flask was set in an oil bath. Hylene T (toluene-2,4-di-isocyanate was dropped into the said silica while the silica was being vigorously stirred at room temperature of about 25° C. In this case 0.185 equivalents (i.e., 27.5 grams) of Hylene T was added through the dropping funnel. When the addition was complete the mixture was heated to 60° C. for a half hour and then 0.1 equivalent (i.e., 32.1 grams) of Carbowax 400 was dropped into the mixture with continuing vigorous agitation. The final mixture was held at 60° C. for another half hour. Carbowax 400 is a polyethylene glycol having average molecular weight of 400.

The product of this reaction showed a water repellence of 90% and an ignition loss of 43.1%.

The greases prepared with this product according to the procedure already described had the following properties:

| | |
|---|---|
| Penetration, mm./10 | 298 |
| Appearance | Semi-opaque |
| Water resistance: | |
|     Room temperature | 5% white |
|     At Boiling | Clear |

Thin film heat stability—20 hours' micropenetration mm./10:

| | Color |
|---|---|
| 107° C.—356 | 3B |
| 125° C.—358 | 3B |
| 135° C.—358 | 3B |
| 150° C.—358 | 4B |

| | |
|---|---|
| Bulk heating: | |
|     Micropenetration, mm./10 | 330 |
|     Weight loss, percent | 1.3 |
| Oxidation stability: | |
|     Pressure drop (lbs./in.$^2$) | 6.0 |
|     Weight loss, percent | 0.56 |
|     Micropenetration, mm./10 | 335 |
|     Water washout, percent | 22 |
|     Water absorption, percent | 25 |
|     Bleeding, percent loss (4 days—55° C.) | 0.85 |

EXAMPLE 2

As in the previous test 120 grams of the same finely divided hydrated silica was placed in a three-necked glass flask and Hylene T as previously described was dropped into the silica while it was being vigorously stirred at room temperature (75° F.) To this was added 0.185 equivalent of Hylene T (27.5 gr.). The temperature of the mixture rose from 24° C. to 37° C.

This mixture was heated for 30 minutes at 60° C. and 0.42 equivalent of glycerine (36.0 grams) was then added and the final mixture was heated for 30 minutes more at 60° C. The mixture was agitated continuously throughout the process.

The product of this reaction had 100% water repellence and an ignited loss of 36.6%.

The grease formed according to the process described above had the following properties:

| | |
|---|---|
| Penetration mm./10 | 307 |
| Appearance | Semi-opaque |
| Water resistance: | |
|     Room temperature | 10% white |
|     Boiling | 10% white |

Thin film heat stability—20 hours' micropenetration, mm./10:

| | Color |
|---|---|
| 107° C.—376 | 2B |
| 150° C.—376 | 3–4C |

| | |
|---|---|
| Oxidation stability: | |
|     Pressure drop, lbs./in.$^2$ | 7.5 |
|     Weight loss, percent | 0.95 |
|     Micropenetration, mm./10 | 380 |
| Water washout, percent | 25 |

EXAMPLE 3

Using the treated silica product of Example 1, greases were prepared using the oleaginous liquids shown in the following table. The table also shows the results of tests made on the greases.

| Compound | Dioctyl Sebacate | Ucon-LB-1145 | Tetra (2-ethyl-hexyl orthosilicate) |
|---|---|---|---|
| Penetration, mm./10 | M347 | M300 | M346-365.[1] |
| Grease appearance | Opaque white | Opaque white | Opaque white. |
| Water resistance: | | | |
| Cold | OK | OK | OK. |
| Hot | OK | OK [2] | OK.[2] |
| Oxidation stability (thin film): | | | |
| 20 hrs.—107° C | M398 | M393 | M433. |
| —150° C | M401 | | M400. |
| 65 hrs.—150° C | M379 | | |
| Color (after thin film test): | | | |
| 20 hrs.—107° C | 1 | 2 | 1. |
| —150° C | 3 | 2 | 2. |
| 65 hrs.—150° C | 4 | | |

[1] Thixotropic.
[2] Noticeable H₂O absorption.

The dioctyl sebacate is useful in the range from −65° F. to 347° F. and meets the military specification MIL-L-7808.

The tetra (2-ethylhexyl)orthosilicate has a molecular weight of 544.92, a specific gravity of .8838, a refractive index of 1.48, a freezing point of below 90° C. and a boiling point of about 360° F. at standard conditions.

The Ucon-LB-1145 is a polyalkylene glycol ester. It has a specific gravity of 1.003, a refractive index of 1.45, a flash point of 430° F. and a fire point at 510° F. The viscosity at 100° F. is about 248 centistokes.

EXAMPLE 4

In the following example, the same finely divided hydrated silica as is set forth in Example 1 was first treated with Hylene T or TM and then with diethylene glycol, ethylene glycol, propylene glycol, or polyethylene glycol. Some understanding of the proportions of these additives which are required can be gained from the following table. (Hylene TM is 80% toluene 2,4-diisocyanate and 20% toluene 2,6-diisocyanate.)

Greases were also formed using the same procedure as in the previous examples. The table indicates the effect of variations of these additives on the properties of the greases formed and shows the minimum useful amounts of di-isocyanate and polyol which may be used to form satisfactory greases.

The silicas in the last six tests (79–90) in the table were treated under somewhat different temperature conditions than in the other tests previously described. In each of these latter cases Hylene TM was used with carbowax 400. This latter group of tests indicates that essentially the same silica product and the same grease are obtained no matter which temperature conditions are used provided that sufficient reaction time is provided at each temperature. Test 82 was carried out under the same temperature conditions as in the previous examples. The Hylene TM was added to the finely divided silica at room temperature and then raised to 60° for a half hour as before, after which the Carbowax 400 was added and the total mixture was kept for another half hour at 60° C. In test 84 the finely divided hydrated silica was preheated to 60° and then Hylene TM was added from the dropping funnel and the mixture was allowed to react for a half hour at this temperature after which the Carbowax 400 was added and the total mixture was kept for another half hour at 60° C. In test 88 finely divided silica was preheated to 60° and then the Hylene TM and the Carbowax 400 were added simultaneously from two different sources and the mixture was kept for a half hour at 60° C. In final test 90 the finely divided hydrated silica (12 gr.) was preheated to 100° C. and then the Hylene TM (2.33 gr.) and Carbowax 400 (3.0 gr.) were added simultaneously from two different sources and the product was kept for 5 minutes at 100° C.

| Expt. No | 46 | 35 | 36 | 28 | 43 | 30 | 31 | 71 | 72 | 58 | 62 |
|---|---|---|---|---|---|---|---|---|---|---|---|
| Hylene | T | T | T | T | T | T | T | T | T | T | T |
| Equivalents | 0.125 | 0.25 | 0.25 | 0.125 | 0.185 | 0.185 | 0.25 | 0.185 | 0.185 | 0.185 | 0.185 |
| Percent | 12.2 | 20.0 | 20.5 | 11.5 | 16.1 | 15.3 | 19.7 | 16.8 | 16.8 | 15.0 | 16.0 |
| Additive | EG | EG | EG | DEG | DEG | DEG | DEG | α-PG | β-PG | 200 | 200 |
| Equivalents | 0.25 | 0.25 | 0.42 | 0.25 | 0.25 | 0.35 | 0.35 | 0.25 | 0.25 | 0.22 | 0.15 |
| Percent | 8.9 | 14.8 | 12.8 | 14.2 | 13.4 | 17.8 | 16.9 | 9.9 | 9.9 | 19.6 | 14.0 |
| H₂O repellence, percent | 80 | 90 | 90 | 90 | 80 | 20 | 90 | 50 | 10 | 10 | 50 |
| Ignition loss, percent | 28 | 40.6 | 38.5 | 31.7 | 38.6 | 39.4 | 41.8 | 32.5 | 33.8 | 45.8 | 37.5 |
| Grease—Appearance | T | O | S-O | T | T | T | O | S-O | S-O | T | O |
| Micro-penetration, mm./10 | 238 | 265 | 239 | 254 | 280 | 256 | 268 | 263 | 250 | 272 | 274 |
| Water Resist.: | | | | | | | | | | | |
| Cold | 100% white | OK 20% | OK clear | 100% white | 5% white | 100% white | 5% white | 10% white | 5% white | 15% white | 5% white |
| Hot (with boiling H₂O) | D | OK 5% | OK 5% clear | 100% white | OK clear | 100% white | 40% white | 10% white | OK clear | 30% white | OK clear |
| 20 hr. thin film test: | | | | | | | | | | | |
| 107° C | 351 | 405 | fluid | 355 | 406 | 342 | 365 | 400 | 366 | 327 | 373 |
| 150° C (micropenetration) | 419 | fluid | fluid | 418 | fluid | 380 | 395 | fluid | fluid | 335 | 388 |
| Color: | | | | | | | | | | | |
| 107° C | 2 | 2 | 2 | 3 | 2 | 2 | 2 | 3 | 3 | 2 | 2 |
| 150° C | 4 | 3 | 3 | 4 | 4 | 4 | 3 | 4 | 4 | 4 | 4 |

D=deteriorates. O=opaque. EG=ethylene glycol. PG=propylene glycol. T=translucent. S=semi-opaque. DEG=ethylene glycol. 200=Carbowax 200. 400=Carbowax 400.

| Expt. No | 75 | 65 | 79 | 83 | 82 | 84 | 88 | 90 |
|---|---|---|---|---|---|---|---|---|
| Hylene T & TM | T | T | TM | TM | TM | TM | TM | TM |
| Equivalents | 0.25 | 0.185 | 0.185 | 0.13 | 0.15 | 0.15 | 0.15 | 0.15 |
| Percent | 18.7 | 16.0 | 15.5 | 11.8 | 13.4 | 13.4 | 13.4 | 13.4 |
| Additive | 200 | 400 | 400 | 400 | 400 | 400 | 400 | 400 |
| Equivalents | 0.25 | 0.075 | 0.094 | 0.094 | 0.094 | 0.094 | 0.094 | 0.094 |
| Percent | 20.7 | 14.0 | 16.9 | 17.6 | 17.4 | 17.4 | 17.4 | 17.4 |
| $H_2O$ repellence, percent | 70 | 50 | 90 | 70 | 90 | 80 | 60 | 70 |
| Ignition loss, percent | 45.9 | 35.4 | 36.1 | 37.5 | 37.5 | 38 | 42.2 | 41 |
| Grease—Appearance | S-O | O | T | T | T | T | T | T |
| Micropenetration, mm./10 | 299 | 297 | 296 | 278 | 284 | 282 | 270 | 295 |
| Water Resist.: | | | | | | | | |
| Cold | 5% white | 5% white | OK clear | 10% white | OK clear | 5% white | 20% white | OK |
| Hot | OK clear | OK clear | OK clear | 10% white | OK clear | 10% white | 15% white | 5% white |
| 20 hr. Thin Film Test: | | | | | | | | |
| 107° C | 361 | 385 | 371 | 353 | 350 | 347 | 337 | 338 |
| 150° C | 372 | 392 | 382 | 350 | 361 | 354 | 342 | 355 |
| (micropenetration) Color: | | | | | | | | |
| 107° C | 2 | 2 | 3 | 3 | 3 | 3 | 3 | 2 |
| 150° C | 4 | 3 | 4 | 4 | 4 | 4 | 4 | 4 |
| Initial Temp. of FDS, °C | RT | RT | RT | RT | RT | 60° | 60° | 100° |

EXAMPLE 5

In this example a high surface area, finely divided hydrated silica was used in place of the silica of Ex. 1 but otherwise the grease preparation procedure was the same. This new silica had a surface area of 526 m.$^2$/g., a pH of 4.7, an average particle size of 11 mu and an ignited loss of 13.9%. It was caused to react with 0.15 equivalents of Hylene TM and 0.094 equivalent of Carbowax 400. This silica was preheated to 60° C. and the Hylene TM was added first, followed by a half hour reaction period and then the Carbowax 400 was added through the same dropping funnel and the final mixture was maintained at 60° C. for another half hour. The grease prepared from this product was translucent, had a micropenetration of 297 mm./10, showed only 5% white in the cold water resistance test and only 10% white in the boiling water test and in the thin film test at 107° for 20 hours had a micropenetration of 361 mm./10. In the same test at 150° C. for 20 hours the micropenetration was 369 mm./10. Thus, good greases may be formed from hydrated silicas having areas well above 500 m.$^2$/g.

EXAMPLES 6, 7, 8

Using the same procedures as in Example 1 and the same finely divided silica, 0.185 equivalent of Hylene T was allowed to react with the silica for one-half hour at 60°. Then the amine as shown in the table was added and a further reaction time of one-half hour at 60° was permitted.

| Example | 6 | 7 | 8 |
|---|---|---|---|
| Amine | (¹) | (²) | (³) |
| Equivalents | 0.25 | 0.25 | 0.125 |
| Water repellence, percent | 70 | 70 | 95 |
| Grease—micropenetration (mm./10) | 277 | 249 | 335 |
| Water resistance, percent white: | | | |
| Cold | 100 | 10 | 0 |
| Hot | | | pitted |
| Heat stability thin film, 20 hrs.: | | | |
| 107° C | 397 | 382 | 384 |
| 150° C | fluid | 434 | |

[1] Ethylene diamine.
[2] Ethanolamine.
[3] Tetrahydroxy-ethylethylene diamine.

EXAMPLE 9

In this example a finely divided silica was used having a surface area of 104 m.$^2$/g. and a pH of 7.6. The ignited loss was 9.4%. The P & G particle size was 15 mu and when made up in grease in the usual test, the initial penetration was 243. This was considered a low area, high pH form of finely divided silica. In this example 0.15 equivalent of Hylene T was permitted to react with the finely divided silica for one-half hour at 70 to 80° C. followed by 0.25 equivalent of glycerine which was permitted to react for the same time and temperature. The product had a water repellence of 100% but the grease made from this product was fluid and semi-opaque. However, when the Hylene T was reduced to .06 and the glycerine to 0.10 equivalent and the reaction temperature was 40°, the grease made from this product has a penetration of M338 and both the cold and hot water tests gave a grease which was 100% white. At .03 equivalent of Hylene T and 0.05 equivalent of glycerine the initial water repellence was only 50% whereas the grease had an initial penetration of M287 and decomposed in the cold water test.

EXAMPLE 10

In this experiment the same silica was again used and also the same procedure as in Example 1 except that one equivalent of the Hylene TM and 0.62 equivalent of Carbowax 100 as the polyol were used. With this high proportion of the polyisocyanate the reaction product was sticky and 100% water repellent. It was useful in certain coatings, as on paper.

EXAMPLE 11

The silica of Example 1 was treated as in that case with Hylene T. After treatment for one-half hour at 60° C., the product was transferred to a dispersion of sugar (sucrose) in diethyloxalate and allowed to react in a closed flask at about 184° C. The product was water repellent and it was found that the secondary isocyanate groups had been blocked by the reaction with the sugar thus forming a product with useful properties for paper coating and greases.

EXAMPLE 12

In this example a finely divided silica having a surface area of 202 m.$^2$/g., a pH of 8.1, an ignited loss of 10.0%, a particle size of 12 mu and a grease penetration, with 12% of the untreated silica, of 247 mm./10, was used with 0.15 equivalent of Hylene T. This was treated one-half hour at 70° and then treated further for one-half hour with .25 equivalent of ethylene glycol at the same temperature. The product was 100% water repellent and had a grease penetration of M310. This grease was translucent and turned 40% white when tested in hot water.

EXAMPLE 13

A silica aerogel known as Cab-O-Sil (obtained from Godfrey L. Cabot Company) was used as the base silica. The specification for Cab-O-Sil indicates a surface area of 175–200 m.$^2$/g., a pH of 4.5–6 and a particle size of 15–20 mu. It had an ignition loss of 1.5% and a grease micropenetration figure of M260 when tested with 7.3% of Cab-O-Sil in 92.7% of Tiona 1050 oil. Cab-O-Sil was preheated to 60° C. and then 12 grams was allowed to react with 1 equivalent, i.e., 1.8 grams, of Hylene TM.

The reaction was allowed to continue for one hour. The product was 95% water repellent and showed no change in either the hot or cold water test. It formed a translucent grease at 7.3% of the reaction product with 92.7% of Tiona 1050 oil. This grease had a micro-penetration of M291 mm./10. After heating at 107° for 20 hours this penetration figure was 383 and after heating at 150° for 20 hours it was 444. Similar results were obtained when 0.75 and 0.5 equivalent of Hylene TM were used with this Cab-O-Sil.

When the product was further treated at 60° C. for one hour with sufficient glycerine to react with the residual isocyanate groups which were thus fully protected from further reaction, similar properties were obtained. It should be noted that with this Cab-O-Sil even at 0.5 equivalent of Hylene T, excellent water stability and heat stability was obtained without further additives such as the glycerine. These results are distinctly different than those obtained with a hydrated silica in the sense that the aerogels including fumed or pyrogenic silicas, such as Cab-O-Sil are formed as anhydrous material and pick up from the atmosphere less than 3% $H_2O$, largely in the form of bound water. When treated with a polyisocyanate they do not require a blocking agent for the preparation of greases with satisfactory properties and thus are distinctly different from hydrated precipitated finely divided silica. When these latter silicas are treated with a polyisocyanate they form greases with poor resistance to water and heat unless they are further treated with a blocking agent. This difference illustrates the essence of the present invention.

EXAMPLE 14

An aerogel is the settled internal phase of an aerosol. It is commercially available in two forms, the pyrogenic aerogel of which Cab-O-Sil is an example, and the condensed aerogel of which Santocel is an example. Santocel having the following properties was also treated as Cab-O-Sil was treated in the previous example (13) with 0.5 equivalent of Hylene TM and 0.5 equivalent of ethylene glycol. The product was highly water resistant and was useful as a filler in grease. Santocel C had a loss on ignition of approximately 4.6% and contained about 98% silica on an anhydrous basis. The particle size by sedimentation was about 36% less than 3 microns and 84% less than 21 microns.

EXAMPLE 15

A xerogel is a gel which has shrunk. It is a dry or semi-dry product of partial dehydration of an elastic gel and is characterized as hard, translucent and granular. It is to be differentiated from a finely divided silica which is a silica hydrate precipitated in the form of the ultimate particles of a silica sol.

An example of a xerogel is Syloid AL-1 obtained from Davison Chemical Company having a surface area of about 700 m.$^2$/g., a pH of 3.8, a loss on ignition of about 6% and with 99.6% silica on the anhydrous basis.

Syloid 75 has a loss of ignition of 4%, a pH of 7.0, contains 99.3% $SiO_2$ on the anhydrous basis, has a particle size of 2.9 microns and a surface area of 340 m.$^2$/g.

Syloid AL-1 was treated with 0.5 equivalent of Hylene T at 70° C. for 1 hour and then with 0.5 equivalent of glycerine as in previous examples. A thoroughly satisfactory coating was obtained and the product was useful as a filler or flattening agent in lacquer.

Similarly, a hydrated clay, montmorillonite, and an example of hydrated alumina produced in the finely divided state by precipitation from sodium aluminate and containing about 20% $H_2O$ by ignited loss were treated individually with 0.5 equivalent of Hylene T and 0.5 equivalent of glycerine by the same procedure. Satisfactory products were obtained forming useful fillers for paints, lacquers or coatings.

EXAMPLE 16

A series of tests were carried out with the finely divided silica used in Example 1 except that it was treated to contain 1, 4, 8, and 20% of water. Each of these products was treated as in Example 1 with 0.25 equivalent of Hylene T and finally with the same number of equivalents of ethylene glycol. Reaction, of course, proceeded as indicated by previous examples but the products had properties useful in different ways. For instance, at 1% $H_2O$ the additional ethylene glycol was not necessary to provide a heat stable grease and the initial product was 100% water repellent whereas with 20% of $H_2O$ the initial product was only partially water repellent and the water resistance of the grease obtained was much less than in the case of the silicas having less water of hydration.

EXAMPLE 17

The process of Example 1 was carried out as before except in this case the polyol was pentaerythritol dispersed in benzene and the di-isocyanate was 3,3'-bitolylene, 4,4'-di-isocyanate, dissolved in benzene. Hexamethylene glycol or hexane-diol 1,6 can be substituted in this same system. The products formed in this way showed completely satisfactory and useful properties for grease formulations.

EXAMPLE 18

In this example the finely divided silica of Example 1 was treated with dianisidine di-isocyanate dissolved in benzol and then with sugar dispersed in diethyl oxalate using the same reaction procedure as in Example 11. Again, a satisfactory filler product was obtained for use in paints and lacquers.

EXAMPLE 19

It is to be expected, of course, that mercaptans can be used in place of alcohols and in this case a higher boiling dimercaptan would be required. For instance, ethylene mercaptan has a boiling point of 146 whereas tetraethylene dimercaptan has a boiling point of about 196 which is quite similar to diethylene glycol. When tetraethylene dimercaptan was used in place of the glycol in Example 1, greases were formed which were quite stable on heating in the higher temperature ranges. These mercaptans do have one advantage in the formation of greases in that when the grease starts to break down mercaptan is released and the odor is indicative of the change. Higher mercaptans have less obnoxious odors so that this property could be controlled at will.

Monothioglycol or 2-mercaptoethanol with a boiling point of 158° C. may also be used in this way.

EXAMPLE 20

In this example p,p'-di-isothiocyanatodiphenylmethane dissolved in benzene was used in place of the di-isocyanate on the finely divided silica of Example 1 using the same proportions as before. The product was entirely satisfactory and useful in grease formulations.

EXAMPLE 21

As an example of other compounds which are polyfunctional and in which one of the functional groups reacts more rapidly than the other with the silanol groups on a silica surface or similar hydroxyl groups on other surfaces, we used hexane 2,9-diketene dissolved in benzene in the proportion of about 0.2 equivalent using the finely divided silica and the reaction conditions of Example 1. Again, the product obtained was quite satisfactory and useful in the preparation of greases and coatings.

EXAMPLE 22

While generally, for reasons of economy of time, it is more desirable to carry out these reactions above about 50° C., they can be carried out at room temperature provided sufficient time is allowed. Thus, instead of carrying out the reaction of Example 1 at about 60° the reaction was carried out at room temperature allowing a period of about 3 days for the reaction to complete itself.

A quite similar product having substantially the same products and usefulness was obtained.

EXAMPLE 23

In this example the same finely divided silica was used as in Example 1 but 0.15 equivalent of Hylene TM was caused to react at 60° C. for one-half hour and then 1.05 equivalents of Carbowax 350 was allowed to react for a further one-half hour. This product has good water repellence and a grease prepared from it had good hot water resistance and when tested at a high temperature for 20 hours at 150° C. showed a penetration of M335.

When, on the other hand, 0.083 equivalent of polypropylene glycol 425 was used as the polyol in the same reaction this product also exhibited good water repellence and when made up in a grease, had excellent water resistance and after 20 hours at 150° C. the grease had a penetration of M373.

USES

These materials have a broad range of properties depending on the proportions of each of the reactants used and the substrate. In some cases they are exceptionally useful as fillers for high temperature greases. They are also useful as fillers in plastics, in waxes, non-slip coatings, and in various other coatings such as lacquers and paints, etc. Some have particular high utility in preparation of insecticides whether as a filler or as the reactive agent in removing protective oils and waxes, others are particularly adapted to reinforcing elastomers and treating leathers.

CONCLUSION

I have disclosed the broad invention of changing the surface properties of solids having hydroxyl or equivalent groups on the surface by forming a bridging layer comprising a polyisocyanate between the solid surface and a second reactant which blocks the remaining isocyanate groups. This product followed from the discovery that the reactive isocyanate groups in a polyisocyanate varied in their reactivity with the solid surfaces so that only one group was blocked off by the surface leaving the others free to react with reactive hydrogen in other molecules.

While this invention has very broad applications, it has been exemplified by reactions with finely divided silica, and primarily so-called hydrated, precipitated silica. The products of these reactions between hydrated silica, polyisocyanates, and polyols, etc. have been found when formed over a narrow range of composition, to be especially satisfactory as fillers for greases.

Therefore, while I have discovered a broad family of surface treated solids, I have especially discovered a silica hydrate having an area of from 200 to 600 m.²/g., a particle size of 7 to 30 mu, an ignited loss of about 6–12%, coated with 0.15 to 0.25 equivalent of a polyisocyanate and 0.08 to 0.40 equivalent of a polyol having at least 2 carbon atoms.

As a result of this improvement, grease thickeners have been prepared composed of finely divided hydrated silica coated with polyisocyanate and polyols and these thickeners impart properties superior to greases made with other finely divided hydrated silica thickeners. The most important features obtained are greases with combinations of good penetration, water resistance, and heat stability up to and above 150°C. In addition, the greases prepared from this new type of thickener are stable to oxidation and have good bleeding characteristics. Also, when glycerine, for instance, is used as a polyol, they are not corrosive in the presence of water. They are also satisfactory thickeners for synthetic high and low temperature lubricants.

A less preferred product would be formed from a finely divided hydrated solid of the group of precipitated silica, aluminum silicate and a hydrated, fine clay coated with from 0.05 to 1 equivalent of a polyisocyanate and 0.05 to 1 equivalent of a group comprising organic compounds having a reactive hydrogen—e.g., alcohol, thiol, amine, imine, phenols, carboxyl, amide and compounds containing active methylene groups capable of enolization.

The term "consisting essentially of" as used in the following claims is meant to include compositions containing the named ingredients in the proportions stated and any other ingredients in the proportions stated and any other ingredients which do not destroy the usefulness of the compositions for the purposes stated in the specification.

What is claimed is:

1. A finely divided siliceous product consisting essentially of the reaction product of:
    (a) a solid substrate of hydrophilic inorganic material having surface hydroxyl groups, said substrate being selected from the group consisting of precipitated silicas; silicates and aluminates of divalent and trivalent metals; and metal oxides, hydroxides and carbonates of polyvalent metals,
    (b) between 0.05 and 1.0 equivalent of a bridging compound having the formula $R(XCY)_{n>1}$, wherein R is an organic hydrocarbon group, C represents carbon, X is a member selected from the group consisting of C and N, and Y is selected from the group consisting of a chalcogen and a —NA group and wherein A is selected from the group consisting of hydrogen and a monovalent hydrocarbon radical, and
    (c) between 0.05 and 1.0 equivalent an organic blocking compound consisting essentially of an organic compound with at least two carbon atoms and at least one hydrogen atom which is more reactive with said bridging compound than are the hydroxyl groups of the substrate.

2. The product of claim 1 wherein said substrate is precipitated silica having a surface area of 50–800 m.²/g., a particle size below 100 mu, and 4–20% water.

3. The product of claim 1 wherein said bridging compound is a polyisocyanate.

4. The product of claim 1 wherein said blocking compound is a polyol.

5. The product of claim 1 wherein said blocking compound is an alcohol.

6. The product of claim 1 wherein said substrate is hydrated silica having an area of 200–600 m.²/g., a particle size of 7–30 mu, and an ignited loss of about 6–12%.

7. A finely divided siliceous product consisting essentially of the reaction product of:
    (a) a substrate of precipitated silica having an area of 50–800 m.²/g., a particle size below 100 mu, and 4–20% water;
    (b) 0.15 to 0.25 equivalent of a bridging compound consisting of a polyisocyanate, and
    (c) 0.08 to 0.40 equivalent of a blocking compound consisting of glycerine.

8. A finely divided siliceous product consisting essentially of the reaction product of:
    (a) a substrate of precipitated silica having an area of 50–800 m.²/g., a particle size below 100 mu, and 4–20% water;
    (b) 0.15 to 0.25 equivalent of a bridging compound consisting of a polyisocyanate, and
    (c) 0.08 to 0.40 equivalent of a blocking compound consisting of a polyalkylene glycol.

9. A finely divided siliceous product consisting essentially of the reaction product of:
    (a) a substrate of precipitated silica having an area of 50–800 m.²/g., a particle size below 100 mu, and 4–20% water;
    (b) 0.15 to 0.25 equivalent of a bridging compound consisting of a polyisocyanate, and
    (c) 0.08 to 0.40 equivalent of a blocking compound consisting of a polyol.

10. A finely divided siliceous product consisting essentially of the reaction product of:
    (a) a substrate of precipitated silica;

(b) 0.15 to 0.25 equivalent of a bridging compound consisting of a polyisocyanate; and
(c) 0.08 to 0.40 equivalent of a blocking compound consisting of a polyol.

References Cited by the Examiner
UNITED STATES PATENTS

| | | | |
|---|---|---|---|
| 2,588,090 | 3/52 | Delmar | 260—448 |
| 2,675,149 | 10/53 | Iler | 106—308.0 |
| 2,728,740 | 12/55 | Iler | 106—308.0 |
| 2,739,121 | 3/56 | Weihe et al. | 252—25 |
| 2,766,209 | 10/56 | Marshall et al. | 252—49.7 |
| 2,780,611 | 2/57 | TeGrotenhuis | 106—308 |
| 2,780,612 | 2/57 | TeGrotenhuis | 106—308 |
| 2,789,919 | 4/57 | Eastes et al. | 106—308 |
| 2,859,234 | 11/58 | Clem | 260—448 |
| 2,921,028 | 1/60 | Stratton | 252—49.7 |
| 2,975,071 | 3/61 | Ferrigno | 106—308 |

TOBIAS E. LEVOW, *Primary Examiner.*

JULIUS GREENWALD, JOHN H. MACK, JOHN R. SPECK, *Examiners.*